United States Patent

Kielwein

[11] Patent Number: 5,779,177
[45] Date of Patent: Jul. 14, 1998

[54] BELT RETRACTOR FOR A SAFETY BELT HAVING PLASTICALLY DEFORMABLE RATCHET TEETH

[75] Inventor: Thomas Kielwein, Eschach, Germany

[73] Assignee: TRW Occupant Restraint Systems GmbH, Alfdorf, Germany

[21] Appl. No.: 776,962
[22] PCT Filed: Jul. 1, 1996
[86] PCT No.: PCT/EP96/02870
    § 371 Date: Feb. 13, 1997
    § 102(e) Date: Feb. 13, 1997
[87] PCT Pub. No.: WO97/02163
    PCT Pub. Date: Jan. 23, 1997

[30] Foreign Application Priority Data

Jul. 3, 1995 [DE] Germany .......... 195 24 162.2

[51] Int. Cl.[6] ............................................. B60R 22/28
[52] U.S. Cl. ............................ 242/382.6; 242/379.1
[58] Field of Search ....................... 242/379.1, 382.6

[56] References Cited

U.S. PATENT DOCUMENTS

| | | |
|---|---|---|
| 4,497,458 | 2/1985 | Gueguen et al. |
| 4,506,844 | 3/1985 | Ernst. |
| 4,844,375 | 7/1989 | Ballet ............................ 242/382.6 |
| 5,333,906 | 8/1994 | Fujimura et al. |
| 5,558,295 | 9/1996 | Bauer ............................ 242/379.1 |

FOREIGN PATENT DOCUMENTS

| | | |
|---|---|---|
| 3421960 | 12/1985 | Germany. |
| 3437693 | 4/1986 | Germany. |
| 3614457 | 4/1987 | Germany. |
| 4000313 | 7/1991 | Germany. |

Primary Examiner—John P. Darling
Attorney, Agent, or Firm—Tarolli, Sundheim, Covell, Tummino & Szabo

[57] ABSTRACT

In a belt retractor for a safety belt comprising a housing (12) which possesses two parallel limbs (14), in each of which an opening (18) is formed, a belt drum (20), which is so mounted rotatably in the housing (12) that sets (22) of ratchet teeth provided at the drums's axial ends are arranged within the openings (18) with an allround clearance from the same, and a load bearing pawl (30), which for a selective locking of the belt drum (20) is able to be engaged with the ratchet teeth (22) thereof, the belt drum (20) being adapted to be shifted in a radial direction in relation to its axis (C) by a load applied to it in the locked condition until the ratchet teeth (22) thereof are supported in the openings (18) of the limbs (14), the intention is to reduce the maximum load acting on the pawl. For this purpose at the edge of the openings (18) a respective set (40) of teeth is formed, which corresponds to the sets of ratchet teeth (22) but possesses at least one support portion (42), which is adapted to be plastically deformed by the ratchet teeth (22), when the belt drum (20) is shifted under a high load in the radial direction.

8 Claims, 2 Drawing Sheets

BELT RETRACTOR FOR A SAFETY BELT HAVING PLASTICALLY DEFORMABLE RATCHET TEETH

The invention relates to a belt retractor for a safety belt, comprising a housing which possesses two parallel limbs, in each of which an opening is formed, a belt drum, which is so mounted rotatably in the housing that sets of ratchet teeth provided at the drums's axial ends are arranged within the openings with an allround clearance from the same, and a load bearing pawl, which for a selective locking of the belt drum is able to be engaged with the ratchet teeth thereof, the belt drum being adapted to be shifted in a radial direction in relation to its axis by a load applied to it in the locked condition until the ratchet teeth thereof are supported in the openings of the limbs.

When the belt drum locks it is possible for the tension load applied via the belt drum to lead to a radial displacement of the belt drum, whose bearings are designed to yield. In the case of a high load, as for instance during emergency braking, the ratchet teeth on the belt drum come into contact with the edges of the openings in the housing limbs with the result that the belt drum will now bear radially against the housing. However, the pawl moved into engagement with the teeth of the belt drum bears the full locking load in the peripheral direction. Should this engagement be caused by a crash, such locking load will assume extremely high values.

One object of the invention is to reduce the maximum locking load which acts on the pawl of a belt retractor of the type initially mentioned.

In accordance with the invention there is a provision such that a set of teeth is formed at the edge of each opening, which corresponds to the sets of ratchet teeth but possesses at least one support portion which is adapted to be plastically deformed by the ratchet teeth when the belt drum is shifted under a high load in the radial direction. Owing to the invention it is only necessary for the pawl to bear a part of the locking load, since the housing makes a substantial contribution to withstanding the load in the peripheral direction.

In accordance with a preferred embodiment of the invention the support portion is a metal web, which fills a gap between two adjacent ones of the teeth. This design renders possible a particularly simple and low-cost structure of the support portion.

Further advantageous developments of the invention are recited in the dependent claims.

A preferred embodiment of the invention will now be described with reference to the accompanying drawings in detail.

Figure 1:
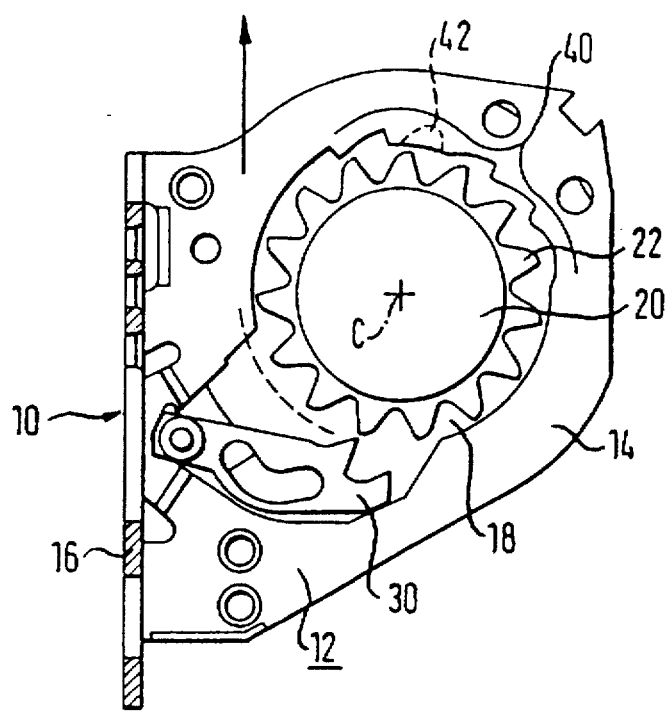
FIG. 1 is a lateral elevation of a belt retractor in accordance with the invention in the resting state thereof.

In the FIGS. 1 through 4 the reader will see a lateral elevation of a belt retractor 10 in accordance with the invention for a safety belt. Same comprises a housing 12, which is U-shaped with two parallel limbs and an intermediate connecting transverse part. In the figures only the limb 14 of the housing and the sectioned middle part 16 thereof are seen. In each limb an opening 18 is formed.

In the housing a belt drum 20 is rotatably mounted which has an axis C and ratchet teeth 22 formed at its axial ends.

These ratchet teeth 22 are so placed in the opening 18 that in the normal condition of the belt retractor, the ratchet teeth 22 have a clearance on all sides from the edge of the opening 18. Up to a certain load of the locked belt drum the bearing (not illustrated) of the belt drum will hold the same with the essentially stationary axis C in the housing.

Figure 2:
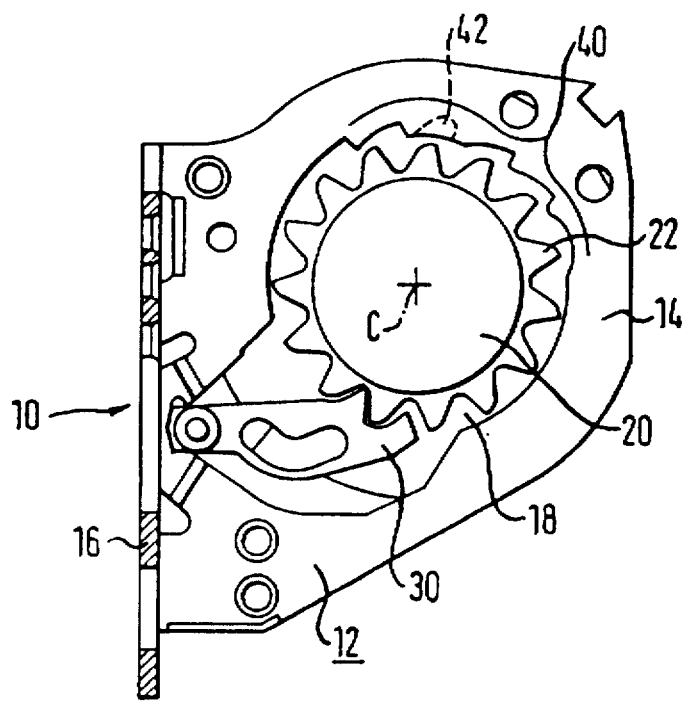
FIG. 2 is a lateral elevation of the belt retractor according to FIG. 1 with a pawl engaged.
Figure 3:
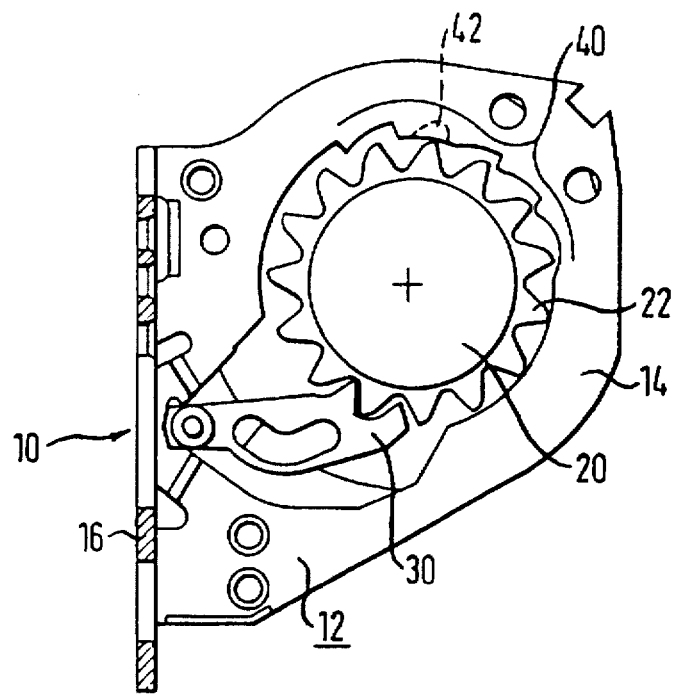
FIG. 3 shows the belt retractor of FIG. 1, the ratchet teeth bearing against the limbs.
Figure 4:
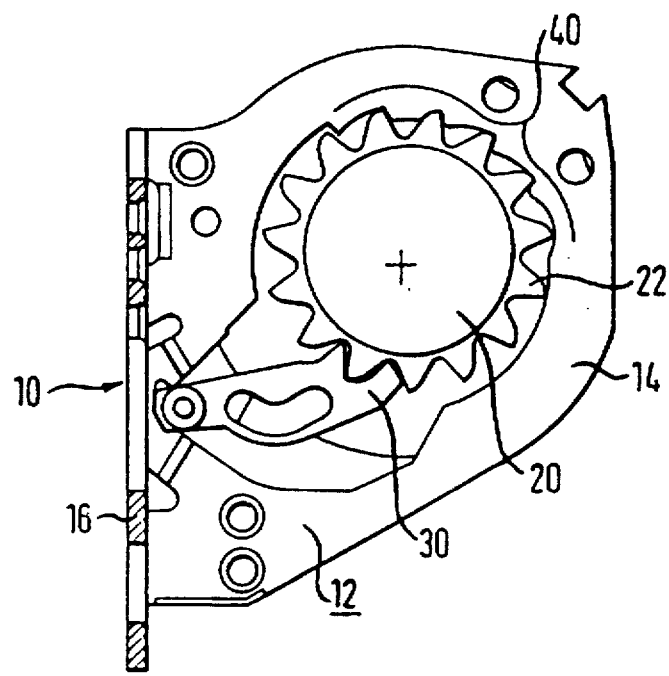
FIG. 4 shows the belt retractor of FIG. 1 with a plastically deformed support portion.

A pawl 30 is arranged on the housing and may be pivoted out of the normal condition depicted in FIG. 1 into the locking condition illustrated in FIGS. 2 through 4, in which the belt drum 20 locks owing to engagement of the free end of the pawl 30 with the ratchet teeth 22 to prevent rotation in the draw off direction of the belt webbing (not illustrated). The movement of the locking pawl into engagement with the ratchet teeth 22 may be performed using any suitable mechanism.

The edge of each opening 18 in the limbs of the housing, which but for the portion adjacent to the locking pawl 30 is substantially circular, is provided with teeth 40 which in the present case are five in number and have a form corresponding to the shape of the ratchet teeth 22. Such set of teeth 40 extends over an angular range of approximately 90° starting approximately 45° following the point at which the belt runs off the periphery of the coil of belt on the belt drum 20. The teeth 40 are so arranged that when the belt drum 20 is locked the ratchet teeth 22 are slightly offset in relation to the teeth 40. The height of the teeth 40 is selected to be approximately half that of the ratchet teeth 22. Considered in the belt unwind direction, a recess is provided behind each last one of the teeth 40. Approximately in the center of the set of teeth 40 one tooth is not cut out so that a support portion 42 is constituted. This support portion 42 possesses a thickness less than that of the rest of the wall of the housing 12 of the belt retractor, that is to say a thickness of approximately 0.8 mm as compared with approximately 2 mm for the remainder of the housing.

The manner of functioning of the belt retractor will now be explained. In FIG. 1 the normal condition of the belt retractor in accordance with the invention is seen. The bearing means for the belt drum 20 holds its ratchet teeth 22 at a clearance on all sides from the edge of the openings 18. When locking of the belt retractor is started, something which in a known manner may be caused in vehiclesensitive or in webbingsensitive manner, the locking pawl 30 will be pivoted into engagement with the ratchet teeth 22. When this takes place the belt drum 20 will not be shifted within the housing 12. This condition of the belt retractor is illustrated in FIG. 2 with the pawl in full engagement.

If now, with the belt drum 20 locked, an increasing load is applied to the belt drum by way of the belt webbing, as from a certain load, as for instance occurs during emergency braking, there will be a displacement of the belt drum in a radial direction in relation to its axis C in the course of which displacement its bearing means will be elastically deformed. Owing to such displacement one tooth of the set of teeth 22 will come into engagement with the support portion 42 of the teeth 40 so that a further displacement of the belt drum 12 and accordingly also a further deformation of its bearing will be prevented. This condition of loading of the belt drum is represented in FIG. 3.

If the load on the belt drum is further increased, there will be a plastic deformation of the support portion 42 of the set of teeth 40 with an concomitant further displacement of the belt drum 12 radially in relation to its axis C. During such event the bearing of the belt drum will yield. In the course of the displacement the belt drum will perform a movement composed of a translation owing to deformation of the support portion 42 and a pivotal movement about the pawl 30 owing to the action on the belt drum 12 in the unwind direction. Owing to such movement the teeth 22, which prior to shifting of the belt drum 12 are offset in relation to the teeth 40, will come into exact engagement with the teeth 40 with the result that at the end of the displacement of the belt drum 12 five ratchet teeth 22 are in engagement with the teeth 40 of the limb 14 of the housing 12 of the belt retractor. This condition is illustrated in FIG. 4. Owing to the recess 40 formed behind the last tooth of the set of teeth unhindered engagement of the ratchet teeth 22 with the teeth of the limb 14 is possible. The value of the load, at which the support portions 42 undergo plastic deformation may be influenced in a simple fashion by a selection of the dimensions of such support portion. In the preferred embodiment of the invention a wall thickness of approximately 0.8 mm in this part will lead to a yield of the support portion 42 under a load on the belt drum of approximately 3 to 4 kN. This value is dependent on two requirements: on the one hand the value should be so high that it is not reached during normal operation of the belt retractor, even in the case of emergency braking of the vehicle, since otherwise there would be a premature plastic deformation of the support portion 42, while on the other hand the value should be so low that in the case of a heavy load, as for example when the vehicle is involved in an accident, there will, even at an early stage, be engagement between the ratchet teeth 22 and the teeth 40 on the housing and consequently a relief of stress on the pawl 30.

I claim:

1. A belt retractor for a safety belt, comprising a housing (12) which possesses two parallel limbs (14), in each of which an opening (18) is formed, a belt drum (20), which is so mounted rotatably in the housing (12) that sets (22) of ratchet teeth provided at the drum's axial ends are arranged within the openings (18) with an all-round clearance from the same, and a load bearing pawl (30), which for a selective locking of the belt drum (20) is able to be engaged with the ratchet teeth (22) thereof and which is so dimensioned as to be able to withstand at least the major part of the loads for locking the belt drum, the belt drum (20) being adapted to be shifted in a radial direction in relation to its axis (C) by a load applied to it in the locked condition until the ratchet teeth (22) thereof are supported in the openings (18) of the limbs (14), characterized in that a set (40) of teeth is formed at the edge of each opening (18), which corresponds to said sets of ratchet teeth (22) but possesses at least one support portion which is adapted to be plastically deformed by the ratchet teeth (22) when the belt drum (20) is shifted under a high load in the radial direction.

2. The belt retractor as claimed in claim 1, characterized in that the support portion is constituted by a metal web (42) filling up a gap between two adjacent teeth (40).

3. The belt retractor as claimed in claim 2, characterized in that the wall thickness of the limbs (14) is locally reduced at the position of the metal webs (42).

4. The belt retractor as claimed in claim 3, characterized in that the wall thickness of the limbs (14) is reduced at the position of the metal webs (42) from approximately 2 mm to approximately 0.8 mm.

5. The belt retractor as claimed in claim 1, characterized in that the teeth (40) extend over an angular range of approximately 90° starting approximately 45° behind the run-off point of the belt on the periphery of the coil of belt on the belt drum (20).

6. The belt retractor as claimed in claim 1, characterized in that the height of the teeth (40) is only approximately half that of the ratchet teeth (22).

7. The belt retractor as claimed in claim 1, characterized in that each set of teeth (40) comprises five teeth and in that the support portion (42) respectively fills the gap in the middle of each set (40) of teeth.

8. The belt retractor as claimed in claim 1, characterized in that a recess is formed behind the last tooth of each set (40) of teeth as considered in the direction of unwinding of the belt.

* * * * *